Patented Mar. 22, 1932

1,850,983

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF PRODUCING FENCHONE

No Drawing. Application filed January 14, 1928. Serial No. 246,904.

My invention relates to a method for producing fenchone, and more particularly relates to a method of producing fenchone through the oxidation of fenchyl alcohol by the use of a mixture of acids containing nitric acid. Further, my invention relates to the production of fenchone through the oxidation of fenchyl alcohol by the use of straight nitric acid.

In accordance with my invention I have discovered that fenchone may be economically and efficiently produced by the oxidation of fenchyl alcohol with about one-half volume of nitric acid (40° Bé.) or even less. In carrying out the method in accordance with my invention where nitric acid is used there need be no very large excess of nitric acid. For example, where one part of liquid fenchyl alcohol is oxidized with one-half its volume of nitric acid, there would only be present about 50% excess of nitric acid.

Further, according to my invention I have discovered that fenchone may be economically and efficiently produced by the oxidation of fenchyl alcohol with mixed acids say, for example, a mixture of sulphuric and nitric acids, the mixture being diluted with water.

Fenchyl alcohol, which has a boiling point of about 201° C.–202° C. may be separated in crystalline form from, for example, pine oil. For the separation of fenchyl alcohol pine oil may desirably be thoroughly fractionated in order to obtain a cut rich in fenchyl alcohol and from which the fenchyl alcohol may be separated in crystalline form by refrigeration. It will be understood that the process according to my invention is not dependent upon any particular source or method of obtaining fenchyl alcohol.

As a more specific illustration of the method embodying my invention, for example, where nitric acid is used for effecting the oxidation of fenchyl alcohol to fenchone, say about 100 parts of fenchyl alcohol, boiling point about 201° C.–202° C., obtained from any suitable source and by any convenient method, are added gradually to about 150 parts of nitric acid of a concentration of about 30%. The nitric acid should be heated to about 80° C., at which temperature nitric oxide fumes will indicate that oxidation to fenchone is occurring. The nitric acid should be maintained at a temperature of about 80° C.–90°C. for about an hour after the addition of the fenchyl alcohol to insure completion of the reaction. The crude fenchone produced is then separated from the spent acid and rendered alkaline with an alkaline solution, for example, aqueous sodium hydroxide, from which it is distilled by steam distillation. About 85 parts of refined fenchone, sp. gr. 0.950, boiling range 193° C. to 196° C., will be obtained.

As more specifically illustrative of the method in accordance with my invention involving the oxidation of fenchyl alcohol to fenchone through the use of mixed acids, say 100 parts of fenchyl alcohol are gradually added, with agitation, to about 300 parts of a mixture of acids containing about 13.8% nitric acid, 53.9% sulphuric acid and diluted with about 32.3% water. The mixture is held at about 35° C. for a period of about two hours, during which period the addition of the fenchyl alcohol is gradually effected. On completion of the addition of the fenchyl alcohol the mixture is heated up to about 50° C., at which temperature it is held for about two hours. The crude fenchone is then separated from the spent acids, and refined by distillation from an alkaline solution with steam. About 90 parts of refined fenchone, having a sp. gr. of 0.952 and a boiling range of about 195° C.–197° C. will be obtained.

In the carrying out of the method in accordance with my invention where nitric acid is used, it is preferable to use an excess of nitric acid of about 50%. A smaller excess may be employed, but where a smaller excess is used the reaction temperature should be raised somewhat in order to complete conversion of the fenchyl alcohol to fenchone. It will be understood that the concentration of nitric acid used may vary from that indicated. For example, nitric acid may be used of a concentration within about the following range: 15%–50%.

In the carrying out of the method embodying my invention where mixed acids are used, it will be understood that the exact concentration of acids and the amount of water in the mixture may vary substantially from that given above. For example, the acids and water in the mixture may vary within about the following approximate ranges:—

Nitric acid_____ 10%–35%
Sulphuric acid_____ 40%–65%
Water_____ 20%–40%

It will be further understood that the temperatures used where either nitric acid or mixed acids are utilized may vary within substantial limits and will be dependent more or less upon the conditions, concentration of acid, etc. under which the oxidation is effected.

It will be noted that in accordance with my invention the use of a large excess of nitric acid is avoided with decrease in cost and increase in efficiency. As an advantage arising from the use of mixed acids, it will be noted that the spent acid resulting from the reaction, may be fortified by nitric or strong acids and used again for subsequent treatments of fenchyl alcohol and that oxidation may be effected at lower temperatures and with the yield of a better product than with nitric acid alone.

In the use of mixed acids according to my invention, sulphuric acid, which acts in a sense catalytically to promote the liberation of nitric oxide, is preferably used with the nitric acid. However, it will be understood that sulphuric acid may be replaced by other mineral acids, as for example, phosphoric acid. Further, in place of nitric acid oxides of nitrogen may be employed as the oxidizing agent in the presence of oxygen and water and it will be further understood that small amounts of a halogen, as ferric chloride, and the like, or an oxygenated salt, as potassium chlorate and the like, may be used and which act catalytically to promote the liberation of oxides from the nitric acid.

Further, it will be noted that during the oxidation of fenchyl alcohol the nitric oxides evolved may be recovered by absorption in suitable towers.

Having now fully described my invention, what I claim and desire to protect by Letters Patent is:—

1. The method of producing fenchone which includes oxidizing fenchyl alcohol with nitric acid of a concentration within the range 15%–50% in an amount such that the theoretical excess of nitric acid will not exceed about 50%.

2. The method of producing fenchone which includes oxidizing fenchyl alcohol with nitric acid, the fenchyl alcohol and nitric acid (actual) being in about the proportion of one to one-half parts by weight and the nitric acid being of a concentration within the range 15%–50%.

3. The method of producing fenchone which includes oxidizing fenchyl alcohol with nitric acid, the fenchyl alcohol and nitric acid (actual) being in about the proportion of one to one-half parts by weight, the nitric acid being of a concentration within the range 15%–50%, and the nitric acid being heated during the oxidation at a temperature within the range 70° C.–100° C.

4. The method of producing fenchone which includes oxidizing fenchyl alcohol with a mixture of nitric and sulphuric acids.

5. The method of producing fenchone which includes oxidizing fenchyl alcohol with a mixture of nitric and sulphuric acid, the mixed acids being held at a temperature within the range 30° C.–50° C.

6. The method of producing fenchone which includes oxidizing fenchyl alcohol with a mixture containing nitric acid 10%–25%, sulphuric acid 40%–65% and water 20%–40%, at a temperature within the range 30° C.–50° C.

7. The method of producing fenchone which includes oxidizing fenchyl alcohol with a mixture comprising nitric acid about 13%, sulphuric acid about 54% and water about 33%.

8. The method of producing fenchone which includes oxidizing fenchyl alcohol with nitric acid in the presence of a substance which acts catalytically to promote the liberation of nitric oxide.

9. The method of producing fenchone which includes oxidizing fenchyl alcohol with nitric acid in the presence of an acid which acts to promote the liberation of nitric oxide.

In testimony of which invention, I have hereunto set my hand at Kenvil, N. J., on this 9th day of January, 1928.

IRVIN W. HUMPHREY.